WILLIAM A. LEWIS.
Improvement in Mounting and Securing Car Wheels.
No. 124,835. Patented March 19, 1872.
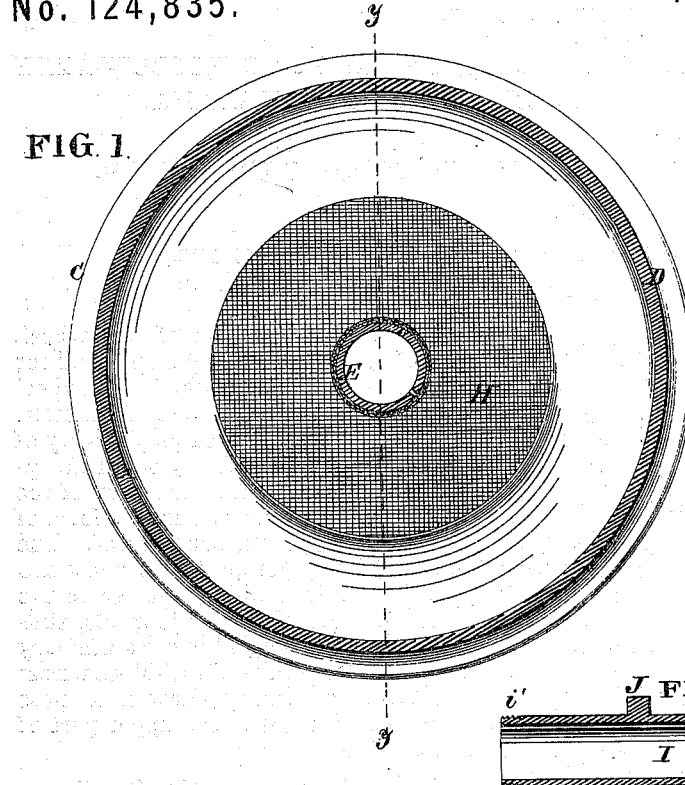
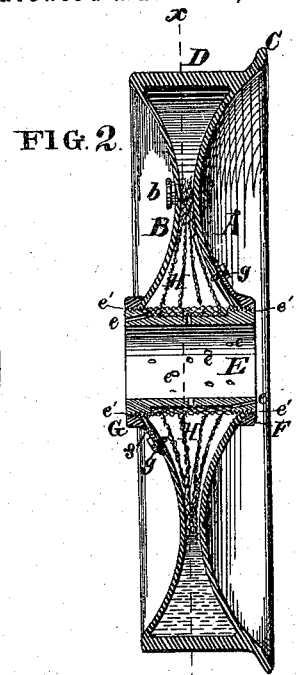
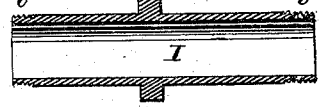
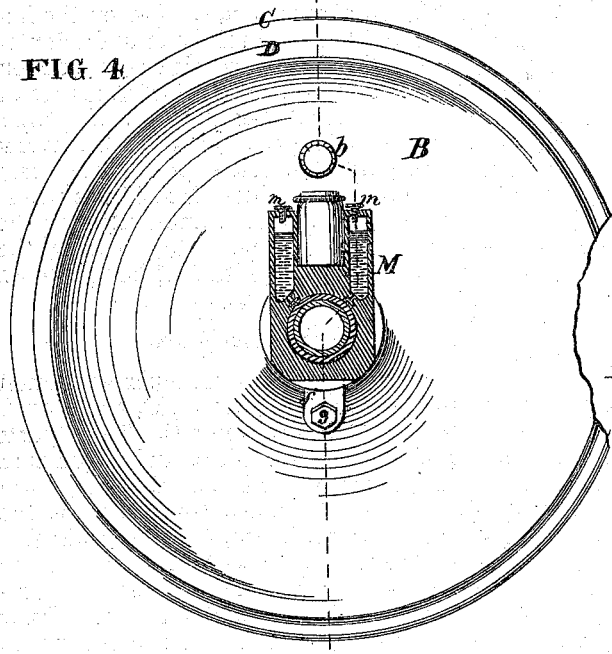
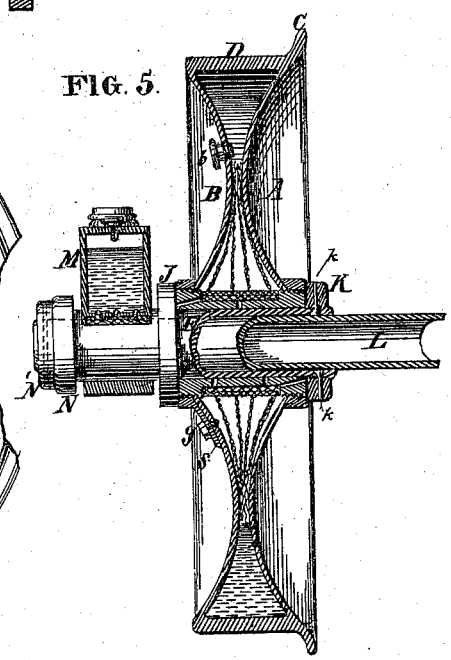
ATTEST.
Walter Allen
Wm. H. Brereton Jr.
INVENTOR.
Wm. A. Lewis
By Knight Bros.
Attorneys.

124,835

UNITED STATES PATENT OFFICE.

WILLIAM A. LEWIS, OF CHICAGO, ILLINOIS, ASSIGNOR TO HOLLOW-AXLE MANUFACTURING COMPANY, OF MISHAWAKA, INDIANA.

IMPROVEMENT IN MOUNTING AND SECURING CAR-WHEELS.

Specification forming part of Letters Patent No. 124,835, dated March 19, 1872.

SPECIFICATION.

I, WILLIAM ARNOLD LEWIS, of Chicago, State of Illinois, have invented a new and Improved Method of Mounting and Securing Car-Wheels, of which the following is a specification:

*Nature and Objects of the Invention.*

I employ, preferably, hollow wrought-iron axles, on which the car-wheels are secured by means of a thimble constituting an inner box or bushing for the wheel, and when in position fitting immovably upon the axle, upon which it may be forced by pressure or other common means after the thimble has been secured within the wheel. The thimble is formed with two journal-surfaces, on one of which the wheel turns, while the other turns within the bearing in the pedestal of the car in the customary manner. These two journal-surfaces are separated by a collar formed upon and projecting from the outside of the thimble, between the hub of the wheel and the customary journal-box or bearing. The wheel being passed over, the inner end of the thimble, prior to the application of the latter to the axle, is secured upon the said thimble by means of a nut, the latter being by preference permanently fixed by radial bolts or screws passed through it from within the end of the thimble. The wheel is securely held between this nut and the collar of the thimble without end play, the necessary end play of the wheel being provided between the axle and its journal-bearings. The axle is secured in its bearings by a nut applied upon a thread at the outer end of the thimble; this nut being secured by a second jam-nut applied upon a thread on the end of the axle, which projects beyond the end of the thimble for this purpose. The outer nut may be permanently secured by a pin passed completely through it and the end of the axle. The wheel is made hollow, of wrought-iron, by a process described in a separate application which I have made for Letters Patent; but its hub is preferably made removable, and secured by screwing it into and through the two webs of the wheel, and applying on its inner and outer ends nuts which, when screwed home, may be secured by means of tap-screws passed through lugs projecting from the edges of the said nuts and into the webs of the wheel. Within the hollow of the wheel I apply oil for lubricating the journal on which the wheel turns, and to insure an effective and constant supply to the said journal I employ a body of asbestus or any suitable capillary material, applied around the hub within the cavity of the wheel, and projecting radially in the form of webs or disks nearly to the rim thereof. The wheel-hub is suitably perforated to allow the oil to pass from this capillary matter to the journal. To lubricate the outer journals, suitable oil-chambers are formed in the stationary bearings on each side of the pillow-blocks, from which the oil is gradually allowed to pass through small apertures in the upper part of the journal-bearing.

*Description of the Accompanying Drawing.*

Figure 1 is a transverse section on the line $x\,x$, Fig. 2, of a car-wheel made and adapted to be applied in accordance with my invention. Fig. 2 is a longitudinal section of the same on the line $y\,y$, Fig. 1. Fig. 3 is a longitudinal section of the thimble. Fig. 4 is a transverse section through the center of the stationary bearing, showing the outer face of the wheel. Fig. 5 is a longitudinal section through the center of the wheel and outer bearing, the thimble and the axle within it being shown partly in elevation.

*General Description.*

The wheel is formed of an inner and outer web, A B, connected by a rim, D, and provided with the customary flange C. These parts may be made of wrought-iron and of common form. E represents the box or hub of the wheel, formed with apertures $e$ to permit the passage of oil from the interior of the wheel to lubricate the journal on which it turns. $e'$ are screw-threads on the ends of the box E, to receive nuts F and G, by which the said box is firmly secured within the center of the wheel, these nuts serving to clamp between them the webs A B. From the nuts F and G project lugs $f$, through which tap-bolts $g$ pass into the web of the wheel, so as to secure the nuts F and G firmly in position. $b$ represents a plug in the outer web B of the wheel, which may be removed at pleasure to permit the introduction of oil for lubrication. This oil, which naturally tends to find the lowest part of the cavity when the wheel is at rest, and to be thrown to the outer part by centrifugal action while in motion, is conducted to the center by disks or webs H of any suitable capillary material, so that it will be gradually and constantly supplied to the journal within the hub of the wheel. The asbestus or other fibrous material applied immediately around the hub E serves to strain any impurities out of the oil. I is a thimble formed at its mid-length, with a projecting collar, J, and at each end with an external screw-thread, $i$. This thimble is adapted to receive upon one of its ends the box or hub E of the wheel, which is secured thereon by a nut, K, so that the wheel may turn upon the said thimble, between the collar J and nut K, without end play. The nut K, having been screwed up to its proper bearing, is there fixed by a screw or pin, $k$, passed through it from the inside of the thimble. This thimble being thus secured within the wheel is driven onto the axle by pressure or other common means, so that in use it constitutes in effect a portion of the axle itself. The outer end of the thimble constitutes the journal of the axle resting upon the stationary bearing M, which is formed with oil-chambers $m$ in the pedestal on either side of the pillow-block. From these oil-chambers oil is allowed to flow gradually to the journal through the asbestus-strainers $m'$, and thence through small apertures shown in Figs. 4 and 5. N is a nut screwed upon the outer end of the thimble, and N' a jam-nut, which is afterward screwed upon the outer end of the axle L, where the latter projects beyond the thimble, and held by a through pin or bolt, as illustrated by dotted lines in Fig. 5. The length of the outer part of the thimble I, between the collar J and nut N, is so proportioned relatively to the bearing M as to allow the necessary end play to the axle to permit the wheels to accommodate themselves to the track.

Operation.

From the above description it will be seen that the wheel has two independent journals, one between itself and the axle, the other between the axle and the stationary bearings. I thus provide for the customary simultaneous turning of the wheels with their axle, and in addition to this allow an independent motion of the wheels upon their axle, which permits them to adjust themselves with perfect freedom, to compensate for unequal motion in passing curves. I further provide for each wheel two efficient journal-bearings, so that in the event of either one becoming obstructed from lack of lubrication or other cause, the resistance will cause it to rest, and the heating or undue wear of the parts will thus be effectually avoided. By these means I am enabled to combine all the advantages of independent movement in the wheels, and complete security and support of the latter upon the axle, with an axle made in one piece.

Claims.

I claim as my invention—

1. The combination of a car-wheel, intermediate thimble, and axle, arranged substantially as herein described.

2. The thimble I, adapted for application to a car-axle in such a manner as to form separate journals for the wheel upon the axle and for the axle in its bearings, substantially as herein described.

3. While disclaiming the securing of car-wheels to their axles by means of bands shrunk, riveted, or otherwise permanently attached, I claim the combination, with the hollow-hub E and hollow wheel A B, of the screw-nuts F G, adapted to clamp the webs A B, as described and shown.

4. The combination, with the hollow wheel A B C D, of the perforated hub E and oil-conductor H, substantially as and for the purposes specified.

WM. A. LEWIS.

Witnesses:
OCTAVIUS KNIGHT,
WALTER ALLEN.